United States Patent Office 3,448,032
Patented June 3, 1969

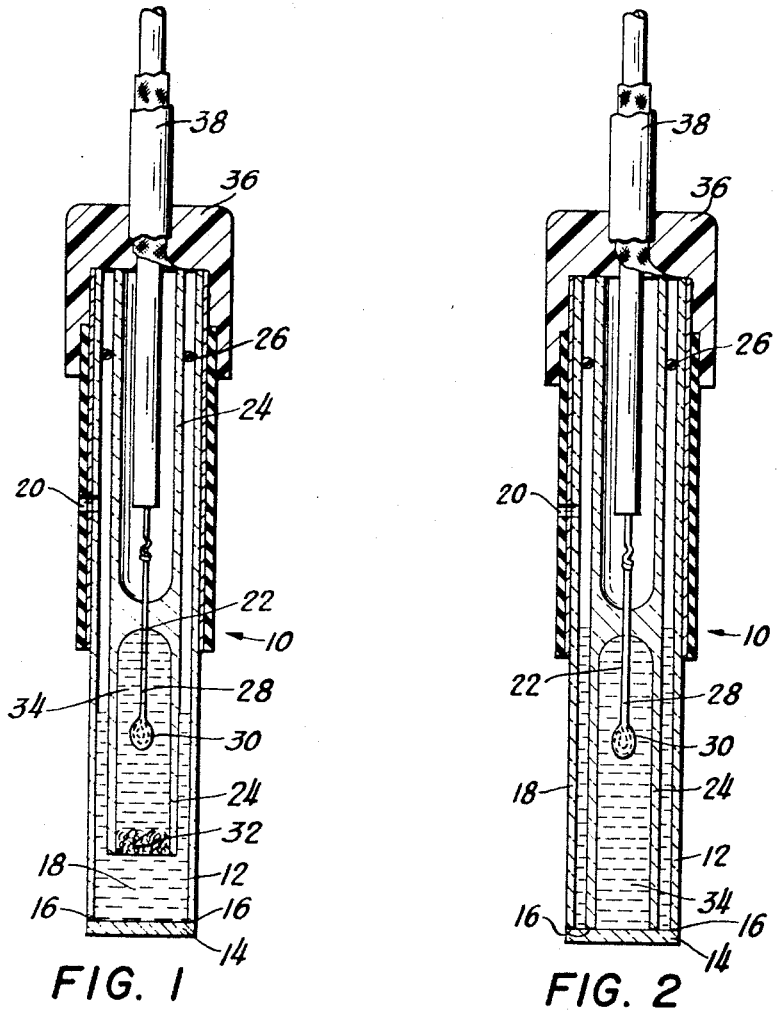
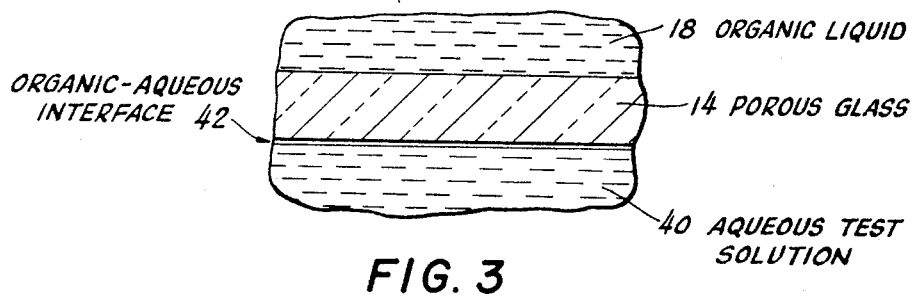
FIG. 3
INVENTORS
ROBERT J. SETTZO &
WARREN M. WISE
BY
Gerhard K. Adam
their Attorney

3,448,032
LIQUID ORGANIC ION-EXCHANGER ELECTRODE WITH ORGANOPHILIC-HYDROPHOBIC MEMBRANE
Robert J. Settzo, Painted Post, and Warren M. Wise, Big Flats, N.Y., assignors to Corning Glass Works, Corning, N.Y., a corporation of New York
Filed May 3, 1966, Ser. No. 547,253
Int. Cl. B01k 3/12, 3/04, 3/06
U.S. Cl. 204—195　　　　　　　　　　16 Claims

ABSTRACT OF THE DISCLOSURE

An electrode for measuring the concentration of an ionic species in an aqueous phase wherein the sensing portion is a liquid organic phase containing an organic ion exchange material capable of exchanging ions with the aqueous phase and being substantially immiscible with the aqueous phase, the organic phase being separated from the aqueous phase by a porous membrane coating with a treating agent to impart an organophilic-hydrophobic property.

---

This invention relates to an electrochemical apparatus for measuring the amount of electrolytes in solution and more particularly, it relates to an apparatus for determining the concentration of ionic species in aqueous solutions.

Electrochemical instruments are well known in analytical chemistry for furnishing very rapid and accurate determinations of chemical constituents in solution. A commonly used laboratory instrument of this type is the pH meter which essentially is made up of a hydrogen sensing electrode, a reference electrode, and a potentiometer. The two electrodes are simultaneously immersed into a test solution such that an electrochemical cell develops, the potential generated by the electrodes being approximately proportional to the logarithm of the reciprocal of the hydrogen ion concentration.

The most convenient and versatile of the hydrogen sensing electrodes is the glass electrode so called because it has a glass membrane at which the electropotential arises. As a more recent development, it was found that glass electrodes sensitive to ions other than hydrogen, such as sodium and potassium, could be made from special glass compositions. Significant work in this field was performed by G. Eisenman et al. and described in United States Patents No. 2,829,090 and No. 3,041,252. However, because of the rigid and solid structure of the glass membrane, such electrodes are primarily sensitive to monovalent ions. It is believed that the glass electrodes function by exchange of ions at the interface between the glass and the solution under test. The mobility particularly of ions having a valence charge greater than one is limited in glass, even though the glass may include ion-exchange sites adequate both spatially and electrically to accept polyvalent ions. While glass electrodes have met with considerable acceptance because of their relative insensitivity to either reducing or oxidizing agents in the test solution, the sensitivity has been limited to cations and it has been urged on theoretical grounds that such electrodes cannot exhibit anionic sensitivity.

Structurally, the glass electrode includes the elements of a glass tube or container, an internal reference electrode, an ion sensing membrane, and a liquid electrolyte contact between the membrane and the internal reference electrode. It is the glass membrane, located so as to cover the opening at the lower end of the glass tube, which makes the electrode selective or sensitive to a particular ion in preference to other ions in the same solution. The ion exchange occurs at the interface between the glass membrane and the test solution, a solid-liquid interface, to give rise to an electropotential. Thus, the membrane has two primary functions: firstly, it acts as a site for the ion exchange and secondly it serves as a barrier to separate the internal electrolyte solution from the test solution and to prevent it from becoming contaminated.

In view of the limitations for ion exchange in the glass membrane, a radically different approach in making electrodes was discovered by J. W. Ross and is disclosed in a copending application Ser. No. 390,016 filed on Aug. 17, 1964. This concept essentially relates to a liquid membrane at which ion exchange occurs formed at the interface between an organic ion-exchanger liquid and the aqueous test solution. The electropotential developed at this interface is sensed by the internal reference electrode and finally recorded on the potentiometer. While the first function of the liquid membrane in the Ross electrode is transferred to the organic ion-exchanger liquid, it is nevertheless necessary in any practical embodiment to prevent the organic ion-exchanger liquid from substantially leaving the electrode body by placing an inert porous barrier across the lower portion of the container element.

However, in splitting out one membrane function, great difficulty arose in selecting a proper barrier membrane for the electrode. The structure of the barrier had to be of such a nature that liquid was permitted to flow through the membrane and form a liquid interface between the organic and aqueous phases. It was thought that the barrier membrane had to be extremely thin on the premise that the thinner the membrane, the shorter the ion transfer paths and correspondingly the more quickly equilibrium could be reached. Heretofore materials recommended for making membranes for this purpose were regenerated cellulose films (about 25 microns thick when dry) and polycarbonate films (8–10 microns thick) irradiated by neutron bombardment and sold under the trademark Nuclepore filter membranes. Unfortunately, both of these barrier materials are nonrigid, fragile, and are difficult to seal to stem tubes especially in the case of glass. Thus, it was necessary to prepare the electrode in a kit form to be assembled by the user in which the barrier was only temporarily held in place by a suitable means such as a rubber pressure seal. Even more important, in the assembled electrode there were still numerous other disadvantages, in general these electrodes had relatively long response times, and more specifically the regenerated cellulose membrane swelled in the presence of the aqueous phase, while the polycarbonate membrane allowed excessive exchanger leakage and required solvent sealing to a polycarbonate tube which is subject to organic solvent attack. Attempts to use a porous glass membrane for the electrode were heretofore unsuccessful since it was impossible to obtain constant readings or reproducibilty of results.

Quite surprisingly, we have discovered an improvement in the ion-exchange electrode whereby it is now possible to make a preassembled unit. In this electrode, the barrier membrane can be permanently attached to the tube portion of the electrode and does not have to be replaced. The membrane is essentially a rigid layer which is insoluble, non-swelling, and chemically inert to the contact solution.

It is, therefore, an object of the present invention to provide an improved ion-exchange electrode for measuring ionic species in aqueous solutions.

Another object is to provide a preassembled ion-exchange electrode having a selectively permeable membrane permanently attached thereto.

It is a further object of the present invention to provide in an ion-exchange electrode a selectively permeable membrane on the surface of which an electropotential develops.

In accordance with the present invention, we have discovered an improved ion-exchange electrode for measuring an ion concentration in an aqueous phase and which comprises a hollow container of electrically insulating material having an opening at a portion, an organic phase of the ion-exchange material within said container and being substantially immiscible with the aqueous phase, an internal reference electrode positioned in the container and in electrical contact with the organic phase, and an organophilic-hydrophobic porous membrane attached to the container and disposed in covering relationship across the opening. This selectively permeable membrane is substantially impermeable to the inorganic phase and preferentially permeable to the organic phase such that when the electrode is dipped into an aqueous test solution the interface at which ion exchange occurs is located in the proximity of the outer surface of the membrane. The organic ion-exchange liquid saturates the pores of the membrane and is permitted to flow through the membrane in extremely minute amounts.

This invention is more clearly understood from the following description taken in conjunction with the accompanying drawings in which:

FIG. 1 is a cross sectional view of a representative electrode formed according to the principles of the present invention.

FIG. 2 is a cross sectional view of another embodiment of an electrode formed according to the principles of the present invention.

FIG. 3 is an enlarged cross sectional view of a fragment of the membrane employed in the embodiments of FIGS. 1 and 2.

Referring now to the drawings in the embodiment illustrated by FIGURE 1, the ion exchange electrode 10 of the present invention is comprised of an electrically insulating container such as an outer glass tube 12 having an opening at each end thereof. One end of the glass tube 12 is tightly capped with a substantially chemically inert porous glass membrane 14 which is attached to the glass tube 12 by a suitable means such as solder glass 16 or directly by a glass to glass seal. The interior portion of the glass tube 12 is filled with an organic ion-exchanger liquid 18 which may be either a liquid ion exchanger per se, a normally solid ion exchanger dissolved in a suitable solvent, or a normally liquid ion exchanger diluted with an appropriate mediator. When assembled and in actual use, the ion-exchanger liquid is in contact with and fills the pores of the membrane 14. In order to permit the ion-exchanger liquid 18 to very gradually flow through the pores of the membrane 14, a vent 20 may be placed in the glass tube 12 to prevent the formation of a vacuum. Immersed directly in the ion-exchange liquid 18 and in electrical contact therewith is an internal reference electrode 22 which is preferably of the silver-silver chloride type. The internal reference electrode 22 is made up of an inner glass tube 24 held in place by means of an O-ring 26, a platinum wire 28 with a silver-silver chloride coating 30, and a salt bridge 34 consisting of saturated potassium chloride solution gelled with gelatinous silica or agar. Optionally, a plug 32 of a suitable inert material such as glass wool soaked in the salt bridge solution can be placed at the bottom of glass tube 22 to enhance the mechanical stability. The end of the tube 12 is suitably capped by lid 36 which acts both as a closure and a support for electrically conductive lead 38 which forms part of the internal electrode 22. The electrode of FIGURE 1 is employed by contacting the outer surface of the membrane 14 with aqueous test solution. Membrane 14 provides a mechanical support which retains the ion-exchange liquid 18 within the tube 12 while also permitting the formation of an effective ion-exchane liquid-liquid interface on the outer surface of the membrane 22 between the ion-exchange liquid and the aqueous test solution.

Referring now to FIGURE 2, this embodiment is similar to that of FIGURE 1 and has like parts designated by identical numerals, but is different in that the inner glass tube 24 is attached directly to the porous membrane 14 by means of solder glass 16. In this embodiment, the inner salt solution 34 is separated from the ion-exchanger liquid 18 by means of the porous membrane 14. The ion-exchanger liquid 18 flows downward and laterally into the pores of the membrane 14 which being an organophilic-hydrophobic layer between the aqueous test solution 40 and the internal salt solution 34 prevents the passage of aqueous material either into or out of the electrode 10.

In the enlarged cross sectional view shown in FIGURE 3, the position of the organic ion-exchange liquid 18 and the aqueous test solution 40 are shown relative to the porous membrane 14. The membrane 14 being of an organophilic-hydrophobic nature permits the passage of minute amounts of organic ion-exchanger liquid 18 into and through the pores whereby a film of the organic liquid 18 is formed on the outer surface of the membrane adjacent to the aqueous test solution 40. Thus, the organic liquid-aqueous liquid interface 42 is formed immediately on the outer surface of the porous glass membrane 14 permitting the electrical potential which develops to come to equilibrium quite rapidly.

For purposes of definition, liquid ion-exchange, as the concept and variations of the phase are used herein, is intended to refer to a liquid system that apparently operates by interchange of ions at an interface between an aqueous phase and an organic phase which is substantially immiscible with the former there being negligible distribution of the aqueous and the organic liquid phases in one another. The interchange or ion-exchange is believed to depend upon an extraction process involving a reaction between the ions in the aqueous phase and ion-exchanger material in the organic phase which latter can be considered as the extractant phase. The extraction system of an ion-exchanger liquid, whether the latter is a liquid ion-exchanger per se or an organic solvent having ion-exchanger material dissolved therein, can be distinguished from other extraction systems such as extraction system by neutral reagents such as ethers, esters, phosphine oxide, and by solid ion-exchangers. The latter are readily distinguishable inasmuch as when used with aqueous solutions they are highly hydrated and generally exhibit low selectivities as exchangers when so hydrated. On the other hand, ion-exchanger liquids, as generally contemplated by the present invention, and liquid ion-exchangers specifically, are substantially anhydrous, and are fully operative in this condition.

As the internal reference electrode in electrical contact with the ion-exchanger liquid for forming the ion-sensitive electrode assembly, a number of known structures can be employed. However, it is preferred, out of consideration of the stability of potential, to use the well-known Ag-AgCl electrode in contact with the saturated KCl solution. As the reference electrode and bridge, either a standard calomel type or Ag-AgCl type assembly is appropriate.

A large number of ion-exchange materials can be used, both of the anionic and cationic type as discussed in the above-mentioned Ross application. The ion-exchange material can be liquid per se under normal conditions. Among typical cation-exchangers of the liquid type are a number of normally liquid organophosphoric acids, such as bis(2-ethylhexyl)phosphoric acid and either or both of the mono- and di- forms of n-butyl phosphoric acid and amyl phosphoric acid.

Certain carboxylic acids are known liquid cation-exchangers such as, for example caproic acid and caprylic acid. Similarly, liquid cation-exchangers among the perfluorocarboxylic acids are typified by perfluorobutyric acid.

A number of liquid anion-exchangers are also known, particularly the primary, secondary and tertiary amines, typical examples of each of which are respective N-trialkylmethylamine, N-lauryl-N-trialkylmethylamine, and N,N,N-triiso-octylamine.

In addition to those ion-exchangers which under normal conditions of temperature and pressure are liquid, other normally solid exchangers are useful in the present invention when dissolved in an appropriate liquid. For example, among the useful solid ion-exchangers are the known solid amines, quaternary ammonium salts, pyridinium salts, alkyl and aryl phosphates and phosphites, sulfonates and many others. Typical examples of such solid exchangers are dioctadecyl amine, tetraheptyl ammonium iodide, cetyl pyridinium chloride, nonadecylphosphoric acid, and dinonylnaphthalene sulfonic acid.

The exchanger materials preferred in one important aspect of the invention are characterized in possessing the property of being highly soluble (and thus, where applicable, highly miscible) in an organic solvent, and substantially insoluble in the aqueous solution under test. Typically, the exchanger material selected then possesses, as a part of the exchanger ion, an organic group or groups (alkyl, aryl, aralkyl or the like) of sufficient size (preferably a chain of six or more carbon atoms) or nature so as to provide a comparatively massive ion which is relatively soluble in an organic solvent but exhibits substantial insolubility in the aqueous solution.

The use of an organic solvent liquid with exchanger material provides several advantages over the direct use of a liquid ion-exchanger alone and has functions other than merely solvent use with solid ion-exchangers. For example, by use of an appropriate mediator liquid, one can adjust the dielectric constant of the mixture thus formed, can adjust the mobility of the sites roughly in accordance with the viscosity of the mediator liquid, can adjust site density in accordance with the ratio of mediator liquid to ion-exchanger, and of course, the nature of the ion-sensitive site can be varied according to the type of ion-exchanger employed with a particular mediator liquid. The ion-exchanger reaction can thus be mediated in accordance with the solvent or mediator liquid selected. The mediator liquid, whether functioning as a solvent for a normally solid ion-exchanger material, or as a diluent or mediator for an ion-exchanger liquid, preferably has a high enough dielectric constant, i.e. the volume resistivity of the ion-exchanger liquid will be sufficiently low, such that the impedance presented to an electrometric measuring device is not so high as to require elaborate shielding or ultra-high sensitivity devices of prohibitive cost.

The use of a mediator liquid having a relatively high dielectric constant requires that the liquid be chosen with considerable care, inasmuch as the characteristic of a high dielectric constant due to large dipole moments is frequently accompained by comparatively good solubility in polar solvents, such as water. However, this is not always the case, and a number of mediators with appropriate properties are known. For example, some of the mediators suitable for use with ion-exchangers in the present invention are alcohols which preferably have long aliphatic chains of at least eight carbon atoms, such as octyl and dodecyl alcohols; ketones such as 2-pentanone; aromatic compounds such as nitrobenzene and orthodichlorobenzene; trialkylphosphonates; and a mixture containing high molecular weight hydrocarbon aliphatic compounds, such as mineral oils, in phosphonates or the like. It also appears that despite the desirability of high dielectric constant for the mediator, the ion selectivity exhibited by the exchanger dissolved in the mediator is greater when the dielectric constant is low. Thus, the selection of mediator characteristics will often be a compromise.

The improvement in the ion exchange electrode to which the present invention is directed concerns the structure and nature of membrane separating the organic phase and the aqueous phase. As shown in FIG. 3 and the accompanying description, the novel membrane is of a porous material which is organophilic, i.e. permeable to the organic phase and thereby permitting the flow of the organic liquid ion exchanger through the pores, and at the same time hydrophobic, i.e. impermeable to the aqueous phase or solution and not wet by water. When the electrode is placed in the aqueous test solution, an interface is formed between the organic phase and the aqueous phase on the outside surface of the membrane. At this liquid-liquid interface, ion exchange occurs and as a result an electropotential is developed. The advantages of such an arrangement is that the interface is continuously being provided with fresh sensing material due to the slow but finite flow of organic solution through the membrane. In addition, since the aqueous phase does not wet the membrane, response times are usually rapid and there is a minimum tendency to transfer test solution from one measurement to the next. Furthermore, in storage of the electrode, immersion in an aqueous solution to prevent drying out of the membrane is not necessary.

In describing materials suitable for the membrane, there are some fundamental considerations which apply generally, while at the same time there are some specific parameters which depend upon the nature of the material itself. Generally the membrane must have a structure of open pores to permit the organic liquid to flow through the membrane. The organic ion exchanger should be permitted to flow very gradually through the membrane to form an organic film on the outer surface. Some of the factors which affect the control of the flow rate include the pore size and number, the thickness of the membrane, and the projected surface area exposed to the aqueous phase. It is desirable that the path through which the organic liquid flows be of a tortuous nature rather than a straight path. The membrane pores must be large enough to permit the organic molecule which is relatively large to pass through it and thus the pores have to be at least slightly larger in size than those of molecular filters. However, the pores must not be so large as to permit an excessive amount of the ion exchanger to flow through the membrane. It is also, of course, desirable that the membrane contain a large percentage of open area of interconnecting pores. The thickness of the membrane is related to the "flow through" characteristics of the ion exchanger phase. The membrane must be sufficiently thick to act as a strong and rigid support for the ion exchange fluid. There is a preferred thickness for each material which is to some extent related to the fact that the thicker the membrane the longer the path between the active surface and the internal reference electrode, but this factor is not nearly as critical as in previously proposed materials, since the novel membrane restricts ion exchange primarily to the active surface.

The materials from which our membrane can be made are usually not organophilic-hydrophobic initially without being subjected to a treatment. We have found a particularly suitable material to be microporous glass discs. These can be fritted glass discs made from sintered or cast glass particles such as are commercially available as porous filters and sold under the trademark Pyrex brand fritted ware. It is also possible to make porous glass membranes from leached phase-separated glasses such as alkali borosilicate glass used in making reconstituted glass. Preferably, the thickness of the glass membrane should be about 0.5 to 0.8 mm. and the membrane pores should have a maximum pore size of 0.9 to 1.4 microns such as designed for Ultra-Fine filtration (porosity of pore diameter being determined in same manner as specified in A.S.T.M. E128). Other materials which may also be used include metal membrane filters such as silver membranes which are commercially available from Selas Flotronics. A particular suitable filter of this type has a uniform, porous structure of pure silver having a porosity of 0.20 micron maximum pore size and a thickness in the range of 1 to 2 mils. Other materials which meet the criteria set forth above may also be used.

In most instances, it is necessary to coat the membrane with a treating agent to impart to the membrane an organophilic-hydrophobic property since the membrane material itself tends to be wet by water. The treating agent must be capable of forming a thin film over the pores of the membrane while not interfering with the desired flow through characteristics by plugging up the pores. It should be substantially insoluble in either the organic or the aqueous phase and be relatively permanent. Application of the coating can be achieved by curing the coating on the substrate such as by polymerization in the process of heat and catalyst or both, or by sorbing or reacting the coating material with the substrate. The preferred materials are broadly designated as silicones, and include the silicone fluids, which are polymers and have the general formula:

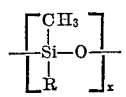

wherein R is a member selected from the group consisting of hydrogen, methyl, and phenyl; and silane coupling agents, as represented by methacrylate propyl trimethoxysilane. Also useful are fluorinated hydrocarbons or polymers and some of the less permanent coating materials including waxes, such as beeswax, and oils are less desirable since these may be somewhat soluble in the organic phase.

Frequently, it is necessary to dilute the treating agent with a volatile solvent which tends to give a much thinner coating. The silicone treating agents are usually applied as a dilute solvent solution prepared by adding hydrocarbon solvents, acetone, trichloroethylene or methylethylketone and stirring to obtain a uniform solution. A representative liquid treating agent is Dow Corning's 1107 fluid, a liquid silicone polymer (viscosity at 77° F. of 30 centistokes) that cures to a clear slick, semi-rubbery surface coating, which is typically added in dilution of 0.1 to 3.0%. This solution can be conventionally applied by dipping or impregating and thereafter curing the coating usually at elevated temperatures of 250 to 300° F. For ease of handling during the coating step, the membrane can be and preferably is attached to the body of the electrode prior to treatment. This can be done for glass membranes by a direct glass-to-glass seal or by adding an intermediate sealing glass. Commercially, it is desirable that the membrane be permanently attached to the electrode. It is, however, possible to attach the membrane by mechanical means whereby the membrane can be removed and replaced if it becomes damaged. In such an electrode, the membrane can be coated with the treating agent either prior to being attached to the electrode or the membrane can be attached initially and then subsequently coated.

Our invention is further illustrated by the following examples:

Example I

An electrode was prepared having the configuration as shown in FIGURE 1. An ultrafine fritted glass disc sold under the trademark Pyrex brand fritted filters and having a maximum pore size of 0.9 to 1.4 microns was attached to the end of a piece of glass tubing by means of a sealing glass, and the disc was then ground to a thickness of approximately 30 mils. A solution containing 2.5% by volume of a liquid silicone polymer (Dow Corning 1107 fluid) in trichloroethylene was poured into the tube and forced with compressed air through the pores of the disc. The solution was also applied to the outside surface of the disc. After the organic solution had been in contact with the glass surfaces for 10 minutes the excess was poured off and the tubing was heated in an oven at a temperature of 170° C. for a time of 15 minutes.

The organic ion exchanger solution was prepared as a 10% calcium didecylphosphate solution in dioctylphenylphosphonate. About one ml. of the ion exchange solution was placed in the tube and used to saturate the membrane. Then a silver-silver chloride saturated KCl reference electrode with a saturated potassium chloride salt bridge portion was immersed in the organic ion exchanger.

The electrode was shielded with aluminum foil attached to a ground and then plugged into a pH meter. When tested for response to a prepared solution having varying calcium ion concentrations, the following results were obtained:

| Ion | Concentration | Millivolt |
|---|---|---|
| Ca++ | $10^{-4}$M | −133.0 |
| Ca++ | $10^{-3}$M | −105.0 |
| Ca++ | $10^{-2}$M | −79.0 |
| Ca++ | $10^{-1}$M | −51.0 |

The electrode showed approximate Nernstian responses for divalent ions taking into account the activity coefficient of the ion in the test solution. These responses should be approximately 24–27 millivolts for decade increases in calcium ion concentration. The speed of response of the electrode was rapid and the electrode stability was excellent even when tested after a period of some months.

Example II

An electrode was prepared as shown in FIGURE 2 in which both the outer and the inner tubes were sealed directly by means of the sealing glass to the inner surface of the membrane. The ion exchanger used was a 10% solution of calcium didecyl phosphate and dioctylphenylphosphonate. The electrode was then tested as described in Example I by using known solutions containing varying concentrations of calcium chloride. The results obtained were almost completely identical to Example I.

Example III

Using the electrode and the procedure of Example I with the exception that the membrane was coated with a silane coupling agent, methacrylate propyl trimethoxysilane, which was dried on the membrane but not thermally cured, an electrode was prepared and tested in various known concentrations of calcium chloride. The results obtained are as follows:

| Ion | Concentration | Millivolts |
|---|---|---|
| Ca++ | $10^{-4}$M | −120.5 |
| Ca++ | $10^{-3}$M | −95.5 |
| Ca++ | $10^{-2}$M | −70.5 |
| Ca++ | $10^{-1}$M | −45.5 |

This experiment indicates that other silicone agents may be used to impart to the membrane an organophilic-hydrophobic property and result in electrodes with good response characteristics for the ionic species being measured.

Example IV

Using the procedure and electrode structure of Example I an anion-exchange electrode was prepared in which the ion exchanger was a solution of N-lauryl-N-trialkylmethylamine in lauryl alcohol as a 1:4 ratio. The electrode was tested in various known solutions of potassium chloride and the results obtained were as follows:

| Ion | Concentration | Millivolts |
|---|---|---|
| Cl− | $10^{-4}$M | +149 |
| Cl− | $10^{-3}$M | +127.5 |
| Cl− | $10^{-2}$M | +75.0 |
| Cl− | $10^{-1}$M | +22.3 |
| Cl− | $10^{-0}$M | −28.5 |

The results of this experiment indicate that electrodes can be made which are sensitive either to anions or cations by merely selecting the appropriate ion-exchanger liquid.

Example V

Using the procedure and type of electrode of Example I an electrode was prepared having an untreated porous membrane. The electrode was tested in various known calcium chloride solutions but gave very erratic responses with so much drifting that it was very difficult to determine when equilibrium had been achieved. The results of this experiment indicate that in the absence of a treatment with an agent to make the membrane organophilic and hydrophobic, the electrode could not be used to accurately measure the activity of ionic species in solution.

Example VI

An electrode was prepared as shown in FIGURE 1 in which a porous metallic silver membrane was attached directly to the outer glass tube as a substitute for the glass membrane of Example I by means of a wax seal (beeswax), and a portion of which during heating was permitted to coat the porous membrane. The silver membrane was obtained from the Selas Corporation under the tradename Flotronic membrane filters, and had a thickness of about 1 to 2 mils with a maximum pore size of 0.20 micron.

The electrode was tested for response to solution having varying concentrations of calcium chloride and the results obtained were as follows:

| Ion | Concentration | Millivolts |
|---|---|---|
| $Ca^{++}$ | $10^{-4}M$ | −106.3 |
| $Ca^{++}$ | $10^{-3}M$ | −88.4 |
| $Ca^{++}$ | $10^{-2}M$ | −64.4 |
| $Ca^{++}$ | $10^{-1}M$ | −40.1 |

The data indicated a porous silver membrane coated with a treating agent to impart to it a temporary organophilic-hydrophobic property. This membrane which is somewhat less desirable than the more permanent coated glass membrane, can nevertheless be used with some effectiveness as a replaceable membrane.

It should be noted that the symbol $x$, as used hereinbefore in the formula for the silicone fluid, is an integer of the repeating units such that the viscosity of the silicone fluid is about in the range of 0.65–1,000,000 centistokes at 25° C.

We claim:
1. An electrode for use in measuring the concentration of an ionic species in an aqueous phase comprising:
   (a) a liquid organic phase containing an organic ion-exchange material capable of exchanging ions with the aqueous phase and being substantially immiscible with the aqueous phase;
   (b) a container for said organic phase having an opening at a portion;
   (c) an internal electrode element in electrical contact with said organic phase; and
   (d) a porous membrane disposed in covering relationship across said opening, said membrane being coated with a treating agent to impart an organophilic-hydrophobic property whereby minute amounts of the organic phase are permitted to flow through the membrane and form an interface with the aqueous phase at the surface of the membrane adjacent to said aqueous phase.

2. The electrode of claim 1 for use in measuring the concentration of cationic species, wherein said liquid organic phase contains an organic cation-exchange material capable of exchanging cations with the aqueous phase and being substantially immiscible with the aqueous phase.

3. The electrode of claim 2, wherein said cationic species is an alkaline earth metal ion.

4. The electrode of claim 1 for use in measuring the concentration of anionic species, wherein said liquid organic phase contains an organic anion-exchange material capable of exchanging anions with the aqueous phase and being substantially immiscible with the aqueous phase.

5. The electrode of claim 4 wherein said anionic species is a halogen ion.

6. The electrode of claim 1, wherein said internal reference electrode is separated from said membrane by the liquid organic phase.

7. The electrode of claim 1, wherein said internal reference electrode is attached directly to the membrane and said membrane is filled with the liquid organic phase.

8. The electrode of claim 7, wherein the attachment is by means of a sealing glass.

9. The electrode of claim 1, wherein said membrane is a member selected from the group consisting of porous glass and porous metal.

10. The electrode of claim 9, wherein said treating agent is a member selected from the group consisting of silicones, fluorinated hydrocarbons and polymers, oils and waxes.

11. The electrode of claim 9, wherein said membrane is a fritted glass disc.

12. The electrode of claim 9, wherein said membrane is a porous silver membrane.

13. The electrode of claim 10 wherein said silicone is a silicone fluid having the general formula:

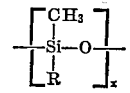

wherein R is a member selected from the group consisting of hydrogen, methyl, and phenyl and $x$ is an integer of the repeating units such that the viscosity of the silicone fluid is about in the range of 0.65–1,000,000 centistokes at 25° C.

14. The electrode of claim 10 wherein said silicone is a silane coupling agent.

15. A preassembled electrode for measuring calcium ions in an aqueous phase and comprising in combination:
   (a) a hollow glass container and having at least one opening therein;
   (b) an organic phase of a cation exchanger liquid within said container and being substantially immiscible with said aqueous phase;
   (c) an internal reference electrode positioned in said container and in electrical contact with said organic phase; and
   (d) a porous glass membrane disposed in covering relationship across said opening and coated with a treating agent to impart to the membrane an organophilic-hydrophobic property such that said membrane becomes substantially impermeable to the inorganic phase and permeable to the organic phase.

16. An improved preassembled electrode for use in measuring calcium ion concentration in an aqueous phase comprising:
   (a) a liquid organic phase of a solution of calcium didecylphosphate in a solvent of dioctylphenylphosphonate, said phase being substantially immiscible with the aqueous phase;
   (b) an outer glass tube for containing said organic phase having an opening at one end;
   (c) an internal silver-silver chloride electrode in electrical contact with said organic phase; and
   (d) a fritted glass membrane
      (1) having a thickness of about 0.5–0.8 mm. and a maximum pore size of 0.9–1.4 microns,
      (2) treated with a dilute solution of a silicone fluid and suitably cured to impart an organophilic-hydrophobic property to the membrane,
      (3) being sealed directly to the glass container by means of a sealing glass in covering relationship across said opening, and
      (4) being filled with said liquid organic phase whereby minute amounts of the organic phase are permitted to flow through the membrane and form an interface with the aqueous phase on the outer surface of the membrane.

References Cited

UNITED STATES PATENTS 2,913,386  11/1959  Clark _____ 204—195

OTHER REFERENCES

"JACS," vol. 86, May 1964, pp. 1901 and 1902.

JOHN H. MACK, *Primary Examiner.*

T. TUNG, *Assistant Examiner.*

U.S. Cl. X.R.

204—180